US012665341B2

(12) United States Patent
Nishitani

(10) Patent No.: US 12,665,341 B2
(45) Date of Patent: Jun. 23, 2026

(54) CONNECTOR INCLUDING RETAINER WITH SEPARATION RESTRICTING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO WIRING SYSTEMS, LTD., Osaka (JP)

( * ) Notice: Subject to any disclaimer, the term of this patent is extended or adjusted under 35 U.S.C. 154(b) by 306 days.

(21) Appl. No.: 18/562,314

(22) PCT Filed: May 16, 2022

(86) PCT No.: PCT/JP2022/020315
§ 371 (c)(1),
(2) Date: Nov. 19, 2023

(87) PCT Pub. No.: WO2022/255068
PCT Pub. Date: Dec. 8, 2022

(65) Prior Publication Data

US 2024/0243506 A1 Jul. 18, 2024

(30) Foreign Application Priority Data

Jun. 2, 2021 (JP) ................................ 2021-092826

(51) Int. Cl.
*H01R 13/436* (2006.01)

(52) U.S. Cl.
CPC ................................ *H01R 13/4362* (2013.01)

(58) Field of Classification Search
CPC ...................... H01R 13/4362; H01R 13/4223; H01R 13/42; H01R 13/6272; H01R 13/428; H01R 13/506; H01R 24/20
See application file for complete search history.

(56) References Cited

U.S. PATENT DOCUMENTS 4,867,712 A * 9/1989 Kato .................. H01R 13/4362 439/744
5,516,308 A * 5/1996 Yamanashi ........ H01R 13/4362 439/752

(Continued)

FOREIGN PATENT DOCUMENTS

JP S61-119285 U1 7/1986
JP S64-054677 A 3/1989

(Continued)

OTHER PUBLICATIONS

International Search Report issued on Aug. 2, 2022 for WO 2022/255068 A1 (4 pages).

*Primary Examiner* — Edwin A. Leon
(74) *Attorney, Agent, or Firm* — Venjuris, P.C.

(57) ABSTRACT

It is aimed to improve the reliability of a retaining function by a retainer. A connector is provided with a housing (10) including a plurality of terminal accommodation chambers (11) arranged in a width direction, terminal fittings (30) to be inserted into the terminal accommodation chambers (11), and a retainer (40) to be assembled with the housing (10) and configured to retain the terminal fittings (30) inserted into the terminal accommodation chambers (11). A projection (33) projecting only from a part in the width direction is formed on an outer surface of the terminal fitting (30). A separation restricting portion (21) is formed in a region of the housing (10) different from the projection (33) in the (Continued)

width direction. The retainer (40) is formed with a locking portion (45) for restricting a displacement in a separation direction from the housing (10) by locking the separation restricting portion (21).

8 Claims, 6 Drawing Sheets

(56) References Cited

U.S. PATENT DOCUMENTS

| | | | | |
|---|---|---|---|---|
| 5,609,503 | A * | 3/1997 | Tsuji | H01R 13/4362 439/752 |
| 5,653,613 | A | 8/1997 | Shimoda | |
| 5,738,551 | A * | 4/1998 | Matsuoka | H01R 13/4362 439/752 |
| 5,865,653 | A * | 2/1999 | Okada | H01R 13/4362 439/752 |
| 6,328,613 | B1 * | 12/2001 | Kashiyama | H01R 13/4362 439/752 |
| 6,811,451 | B2 * | 11/2004 | Mase | H01R 13/4362 439/752 |
| 2018/0309225 | A1 | 10/2018 | Kutsuna et al. | |
| 2019/0379149 | A1 | 12/2019 | Jin et al. | |

FOREIGN PATENT DOCUMENTS

| | | | |
|---|---|---|---|
| JP | 2003-051352 | A | 2/2003 |
| JP | 2008-204883 | A | 9/2008 |

* cited by examiner

CONNECTOR INCLUDING RETAINER WITH SEPARATION RESTRICTING STRUCTURE

CROSS REFERENCE TO RELATED APPLICATIONS

This application is a national phase of PCT application No. PCT/JP2022/020315, filed on 16 May 2022, which claims priority from Japanese patent application No. 2021-092826, filed on 2 Jun. 2021, all of which are incorporated herein by reference.

TECHNICAL FIELD

The present disclosure relates to a connector.

BACKGROUND

Patent Document 1 discloses a connector provided with a housing including a plurality of terminal accommodation chambers arranged in a width direction and a retainer to be mounted into the housing and configured to retain terminal fittings inserted into the terminal accommodation chambers.

PRIOR ART DOCUMENT

Patent Document

Patent Document 1: JP 2019-212549 A

SUMMARY OF THE INVENTION

Problems to be Solved

If the number of the terminal fittings increases, a width of the retainer increases. In the case of a structure for locking both end parts in the width direction of the retainer to the housing as a means for holding the retainer in a state assembled with the housing, there is a concern that the retainer is deformed and a widthwise central part of the retainer is lifted. If the retainer is lifted, the reliability of a function of retaining the terminal fittings is reduced.

A connector of the present disclosure was completed on the basis of the above situation and aims to improve the reliability of a retaining function by a retainer.

Means to Solve the Problem

The present disclosure is directed to a connector with a housing including a plurality of terminal accommodation chambers arranged in a width direction, terminal fittings to be inserted into the terminal accommodation chambers, and a retainer to be mounted into the housing, the retainer retaining the terminal fittings inserted into the terminal accommodation chambers, a projection projecting only from a part in the width direction being formed on an outer surface of the terminal fitting, a separation restricting portion being formed in a region of the housing different from the projection in the width direction, and the retainer being formed with a locking portion for restricting a displacement in a separation direction from the housing by locking the separation restricting portion.

Effect of the Invention

According to the present disclosure, it is possible to improve the reliability of a retaining function by a retainer.

DETAILED DESCRIPTION TO EXECUTE THE INVENTION

Description of Embodiments of Present Disclosure

Figure 1:
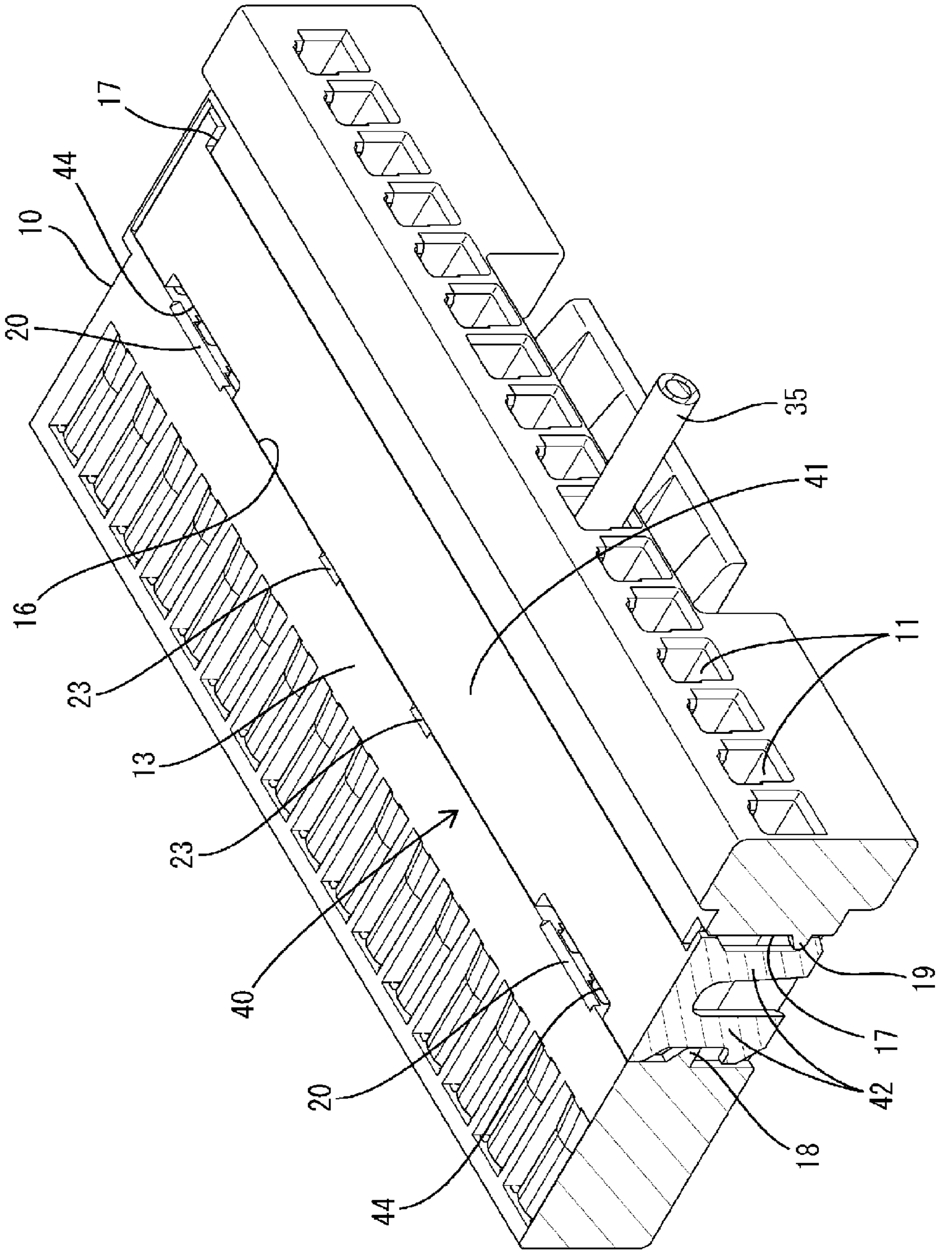
FIG. 1 is a perspective view partly in section of a connector of one embodiment when viewed obliquely from behind.

First, embodiments of the present disclosure are listed and described.

(1) The connector of the present disclosure is provided with a housing including a plurality of terminal accommodation chambers arranged in a width direction, terminal fittings to be inserted into the terminal accommodation chambers, and a retainer to be mounted into the housing, the retainer retaining the terminal fittings inserted into the terminal accommodation chambers, a projection projecting only from a part in the width direction being formed on an outer surface of the terminal fitting, a separation restricting portion being formed in a region of the housing different from the projection in the width direction, and the retainer being formed with a locking portion for restricting a displacement in a separation direction from the housing by locking the separation restricting portion. According to the configuration of the present disclosure, since the displacement of the retainer in the separation direction from the housing is restricted by locking the locking portion to the separation restricting portion, the reliability of a retaining function by the retainer can be improved. By using a dead space where the projection is not present in the width direction, the locking portion of the retainer and the projection can be arranged side by side in the width direction. Even if the terminal fitting is formed with the projection, the housing can be reduced in height in a height direction intersecting the width direction.

(2) Preferably, the retainer includes retaining portions for retaining the terminal fittings by locking the terminal fittings in the terminal accommodation chambers, and the locking portion is arranged adjacent to the retaining portion. According to this configuration, since the locking portion and the retaining portion are adjacently located, the reliability of a retaining function by the retaining portion is high as compared to the case where the locking portion is arranged at a position distant from the retaining portion.

(3) Preferably, the housing includes an accommodation space for accommodating the retainer, the separation restricting portion is shaped by recessing a part of a surface of the housing facing the accommodation space, and a formation region of the separation restricting portion in the width direction is only in an entire width range of one of the terminal accommodation chambers. According to this configuration, since it is not necessary to cut a partition wall portion partitioning between the terminal accommodation chambers to form the separation restricting portion, a reduction in the strength of the partition wall portion can be prevented.

(4) Preferably, a part of at least one of the separation restricting portion and the locking portion is formed with a tapered assembly guiding surface configured to slide in contact with a part of the other in the process of assembling the retainer with the housing. According to this configuration, resistance due to the interference of the separation restricting portion and the locking portion can be reduced by the inclination of the assembly guiding surface in the process of assembling the retainer with the housing.

(5) Preferably, a part of at least one of the separation restricting portion and the locking portion is formed with a tapered separation guiding surface configured to slide in contact with a part of the other in the process of separating the retainer from the housing. According to this configuration, resistance due to the interference of the separation restricting portion and the locking portion can be reduced by the inclination of the separation guiding surface in the process of separating the retainer from the housing.

(6) Preferably, lock portions for holding the retainer in a state assembled with the housing are formed on both widthwise end parts of the retainer, the retainer is formed with a separation operating portion, a jig being brought into contact with the separation operating portion when the retainer is separated from the housing, and the separation operating portion is arranged at a position closer to the lock portion than to the locking portion in the width direction. Since the locking portion is arranged in a narrow region adjacent to the projection of the terminal fitting, it is difficult to secure a sufficient locking force with the separation restricting portion. Thus, it is preferable to reliably assemble the retainer with the housing by enhancing holding forces by the lock portions. In view of this point, the separation operating portion is arranged at the position closer to the lock portion than to the locking portion. By this arrangement, an operation of releasing hold by the lock portion can be reliably performed by the jig even if the holding forces of the lock portions are enhanced.

Details of Embodiment of Present Disclosure

Embodiment

Figure 2:
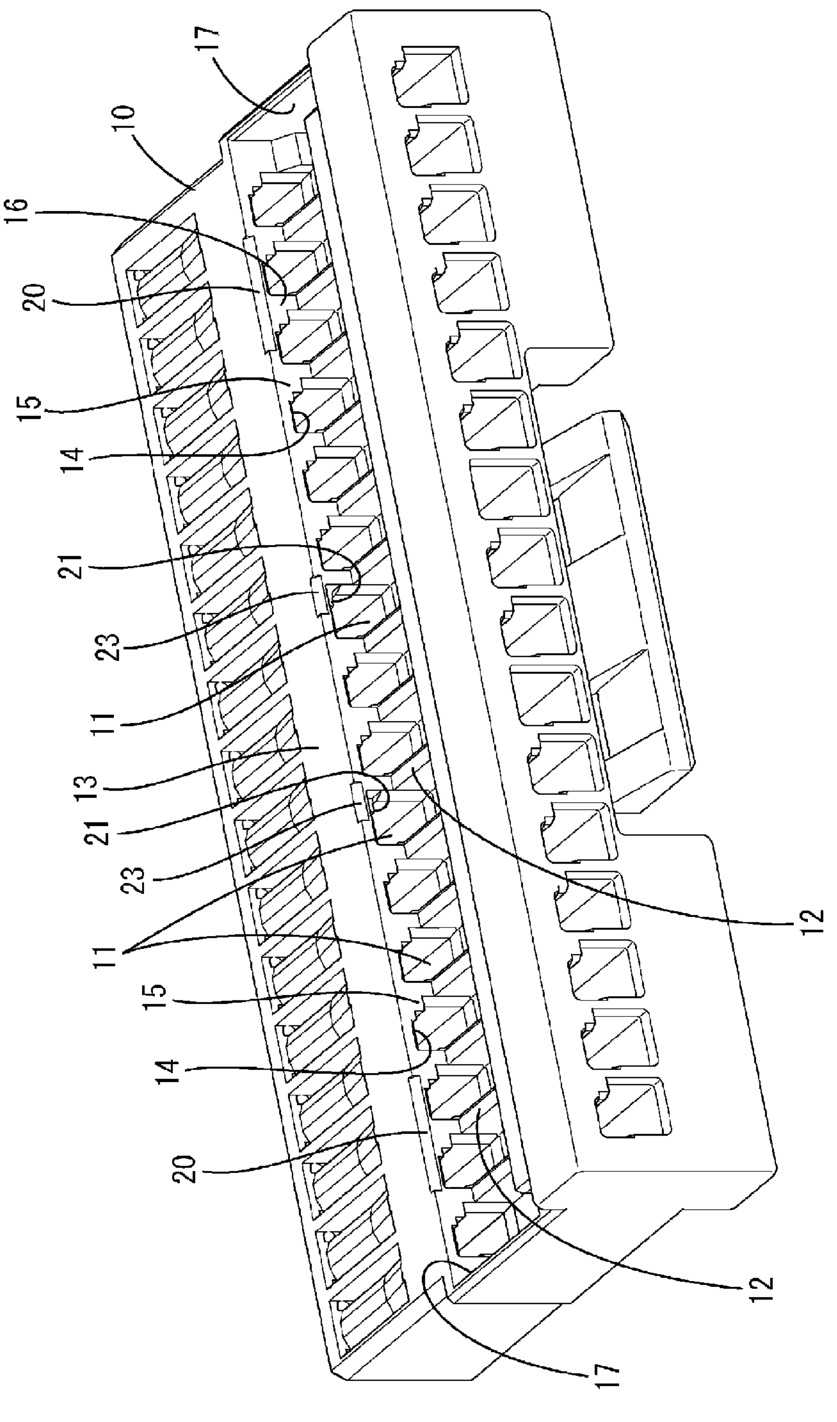
FIG. 2 is a perspective view of a housing with a retainer removed when viewed obliquely from behind.
Figure 3:
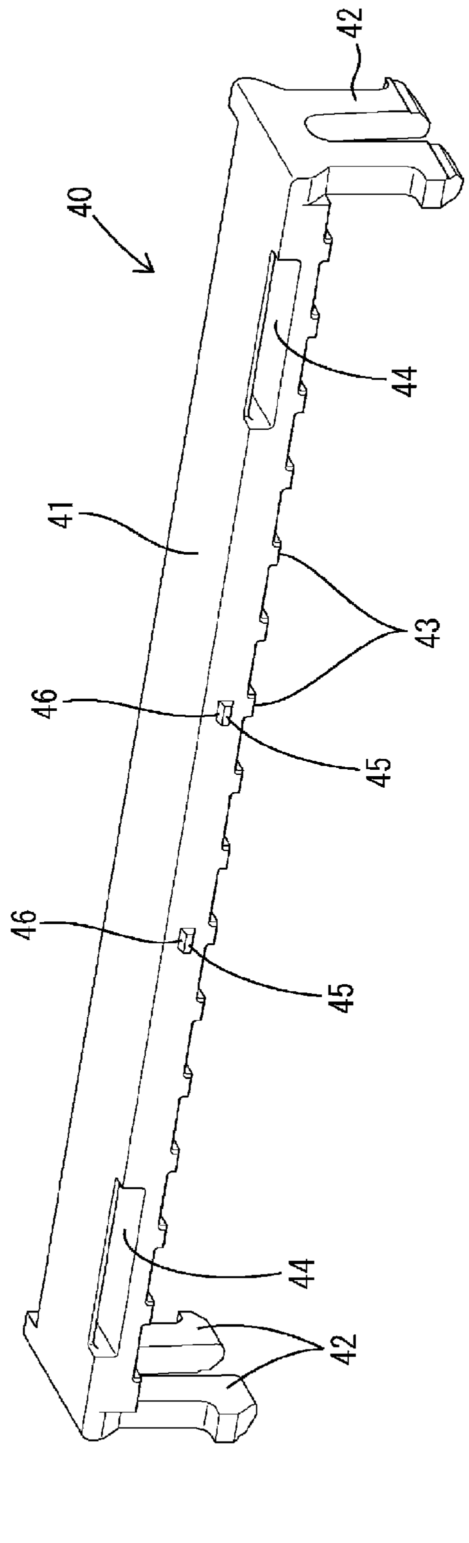
FIG. 3 is a perspective view of the retainer when viewed obliquely from front.
Figure 4:
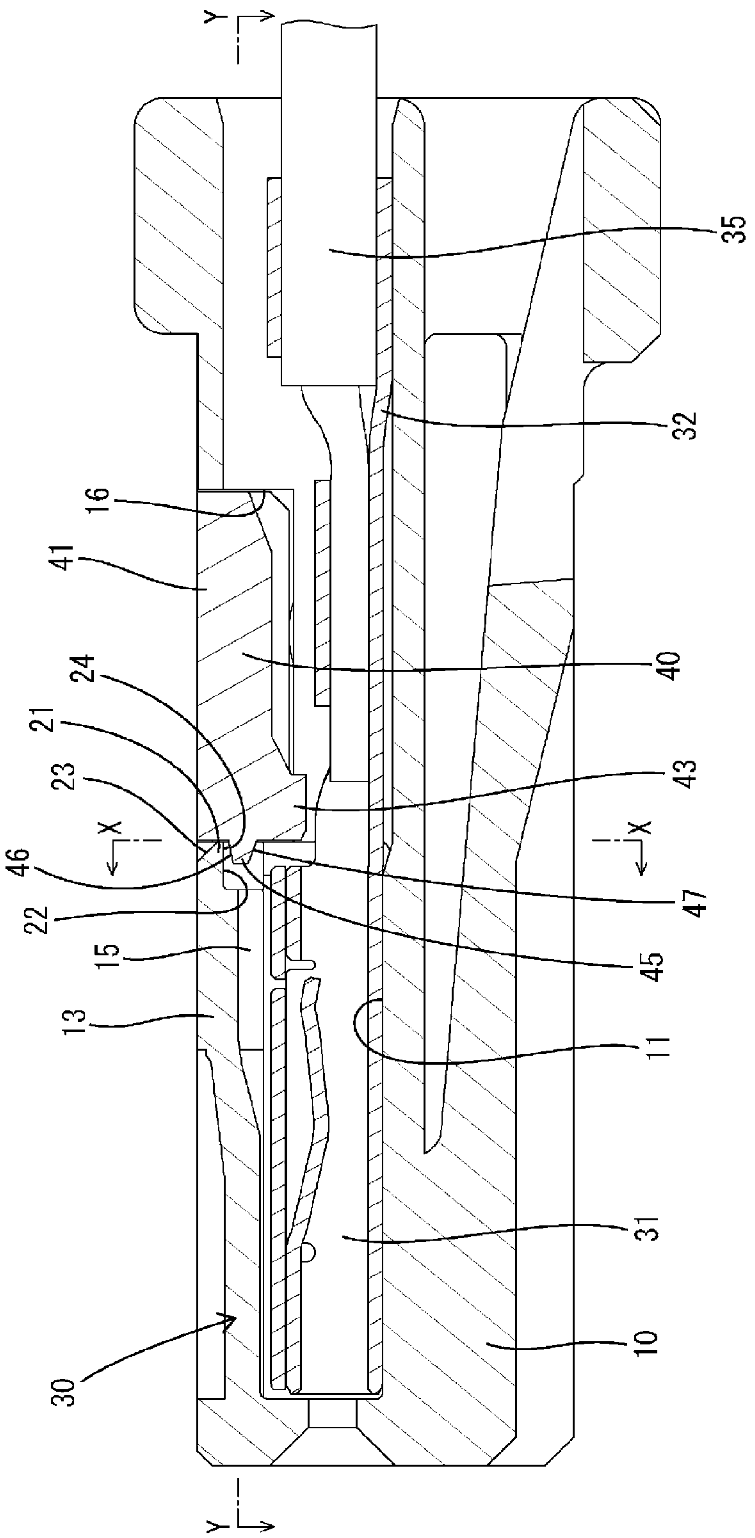
FIG. 4 is a side view in section of the connector.
Figure 5:
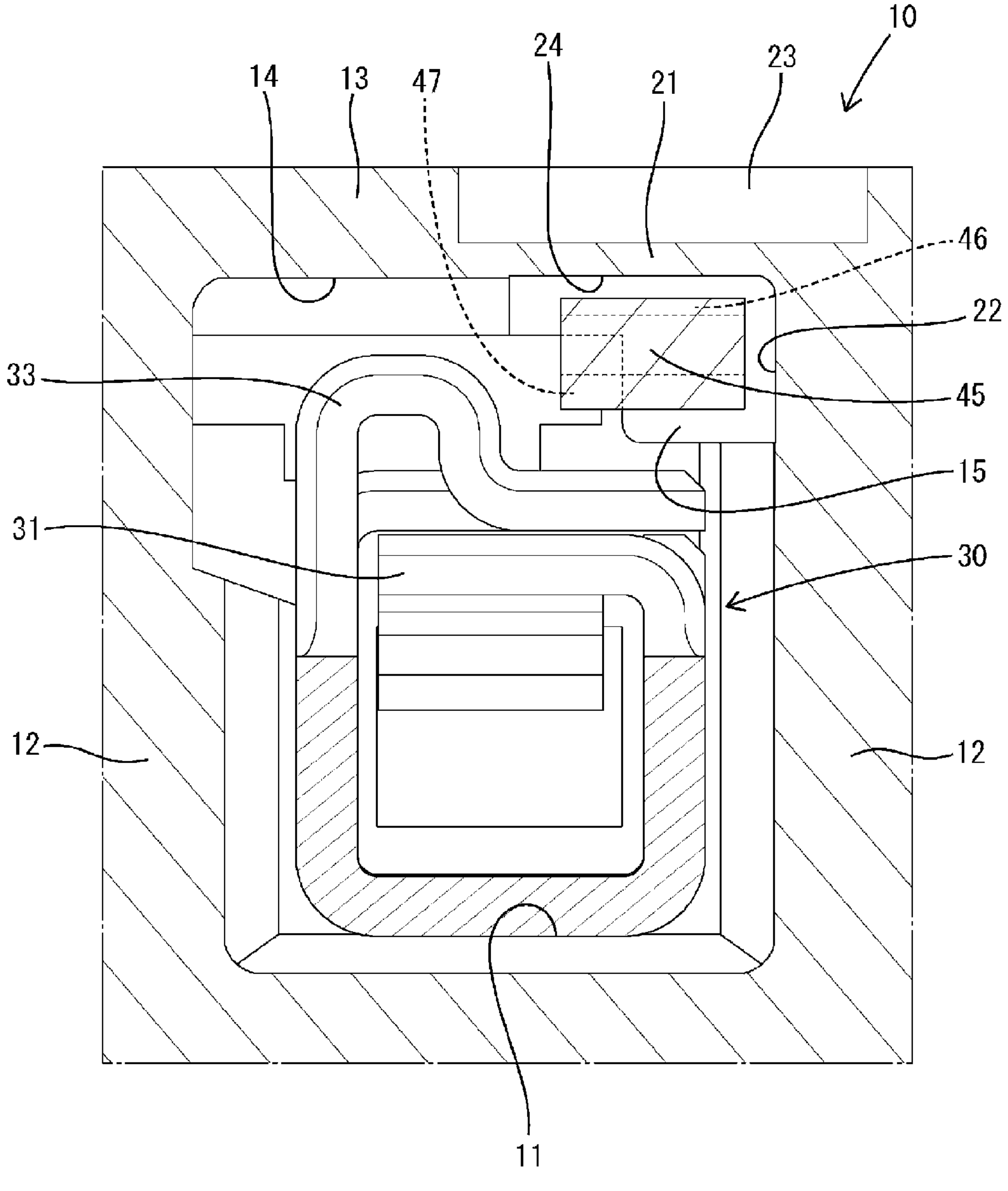
FIG. 5 is a partial enlarged section along X-X of FIG. 4.
Figure 6:
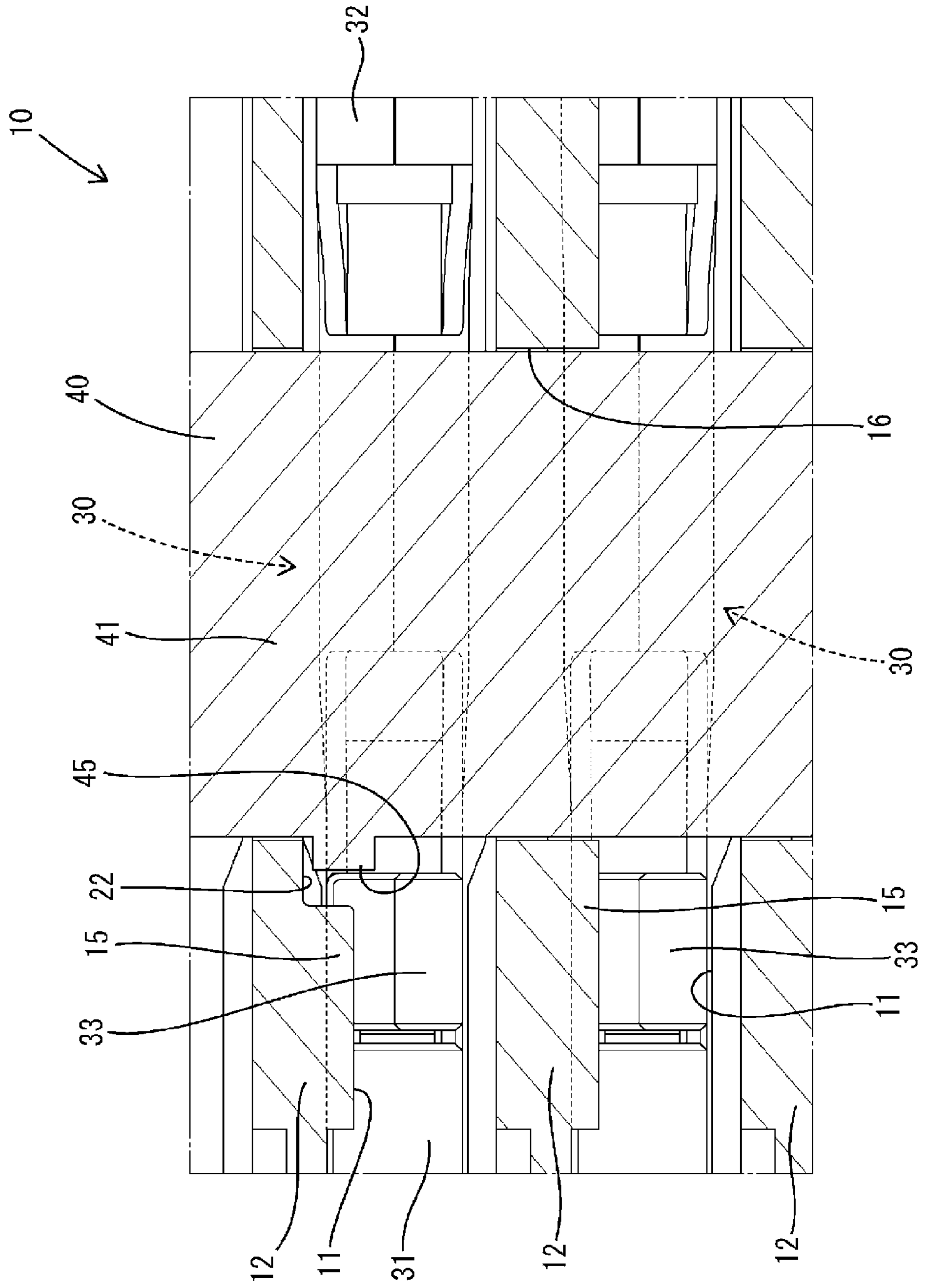
FIG. 6 is a partial enlarged section along Y-Y of FIG. 4.

One specific embodiment of a connector of the present disclosure is described with reference to FIGS. 1 to 6. Note that the present invention is not limited to these illustrations, but is represented by claims and intended to include all changes in the scope of claims and in the meaning and scope of equivalents. In this embodiment, an oblique left upper side in FIGS. 1 and 2 and a left side in FIGS. 4 and 6 are defined as a front side concerning a front-rear direction. Upper and lower sides shown in FIGS. 1 to 5 are directly defined as upper and lower sides concerning a vertical direction. The vertical direction and a height direction are used as synonyms. An oblique left lower side in FIGS. 1 and 2 and a lower side in FIG. 6 are defined as a left side concerning a lateral direction. Left and right sides shown in FIG. 5 are directly defined as left and right sides. The lateral direction and a width direction are used as synonyms.

A connector of this embodiment is configured by assembling a housing 10, a plurality of terminal fittings 30 and one retainer 40. The housing 10 is a single component made of synthetic resin. As shown in FIGS. 1 and 2, the housing 10 has a flat rectangular parallelepiped shape having a height smaller than a dimension in the front-rear direction and having a width larger than the dimension in the front-rear direction.

As shown in FIGS. 2 and 4, a plurality of terminal accommodation chambers 11 elongated in the front-rear direction are formed in the housing 10. The plurality of terminal accommodation chambers 11 are arranged in parallel at predetermined intervals in the width direction. The terminal accommodation chambers 11 adjacent in the width direction are partitioned by partition wall portions 12. As shown in FIGS. 2 and 5, groove portions 14 elongated in the front-rear direction are formed in regions constituting the ceiling surfaces of the terminal accommodation chambers 11, out of an upper wall portion 13 of the housing. The groove portion 14 is formed in each terminal accommodation chamber 11 and arranged only in a region to the left of a widthwise center of the terminal accommodation chamber 11. A region to the right of a widthwise center of the ceiling surface of each terminal accommodation chamber 11 serves as a beam-like portion 15. The beam-like portion 15 is shaped to project downward from the ceiling surface of the terminal accommodation chamber 11 and project leftward from the right side surface of the terminal accommodation chamber 11. The beam-like portion 15 and the groove portion 14 are adjacently arranged in the width direction at the same height in an entire width range of the terminal accommodation chamber 11.

As shown in FIGS. 2, 4 and 6, the housing 10 is formed with one accommodation space 16 for accommodating the retainer 40. The accommodation space 16 is arranged in a central part of the housing 10 in the front-rear direction. The accommodation space 16 is open in the upper surface of the housing 10 and communicates with all the terminal accommodation chambers 11. The upper wall portion 13 of the housing 10 and the plurality of partition wall portions 12 partitioning between the terminal accommodation chambers 11 are facing a front inner surface, out of inner surfaces of the accommodation space 16.

As shown in FIG. 2, a pair of left and right locking spaces 17 are formed in both widthwise end parts of the housing 10. The locking spaces 17 are open in the upper surface of the housing 10 and communicate with both left and right end parts of the accommodation space 16. As shown in FIG. 1, a temporary locking projection 18 and a complete locking projection 19 are formed in the locking space 17. As shown in FIGS. 1 and 2, a pair of left and right jig guiding surfaces 20 are formed in the upper surface of the housing 10. The jig guiding surfaces 20 are arranged at positions closer to the locking spaces 17 than to a widthwise center of the housing 10. The jig guiding surfaces 20 are formed by tapering and recessing a front edge part, out of the opening edge of the accommodation space 16 in the upper surface of the housing 10.

The housing 10 is formed with a pair of separation restricting portions 21. The pair of separation restricting portions 21 are arranged at an interval in the width direction in a widthwise central part of the housing 10. The pair of separation restricting portions 21 are facing two terminal accommodation chambers 11 located in a widthwise central region, out of the plurality of terminal accommodation chambers 11. The separation restricting portion 21 is formed by recessing a part of the beam-like portion 15 facing the accommodation space 16 forward. A recess 22 is formed by recessing the beam-like portion 15 forward. As shown in FIG. 5, the recess 22 is shaped by recessing the ceiling surface of the terminal accommodation chamber 11 and the right inner side surface of the beam-like portion 15. A part of the upper wall portion 13 above the recess 22 functions as the separation restricting portion 21. The recess 22 and the groove portion 14 are adjacently arranged in the width direction at the same height. A formation region of the separation restricting portion 21 in the width direction is only in the entire width range of one terminal accommodation chamber 11.

An assembly guiding surface 23 inclined to be lower toward the rear side, i.e. toward the accommodation space 16, is formed in a formation region of the separation restricting portion 21, out of the upper surface of the separation restricting portion 21, i.e. the upper surface of the upper wall portion 13 of the housing 10. The assembly guiding surface 23 extends in a direction oblique to an assembly direction of the retainer 40 with the housing 10. The lower surface of the separation restricting portion 21, i.e. a surface facing the recess 22, serves as a locking surface 24 perpendicular to the vertical direction. The locking surface 24 is a flat surface perpendicular to the assembly direction of the retainer 40 with the housing 10.

The terminal fitting 30 has a shape elongated in the front-rear direction as a whole. A terminal body portion 31 in the form of a rectangular tube is formed in a front end side region of the terminal fitting 30. A crimping portion 32 in the form of an open barrel extending rearward from the rear end of the terminal body portion 31 is formed in a rear end side region of the terminal fitting 30. The crimping portion 32 is crimped to a front end part of a wire 35. A projection 33 functioning as a stabilizer for preventing inverted insertion is formed on the upper surface of the terminal body portion 31. The projection 33 is shaped by causing only a region to the left of a widthwise center, out of the upper surface of the terminal body portion 31, to project upward. The terminal fitting 30 is inserted into the terminal accommodation chamber 11 from behind the housing 10. With the terminal fitting 30 inserted, the rear end of the terminal body portion 31 is facing the accommodation space 16 and the projection 33 is accommodated in the groove portion 14.

The retainer 40 is a single component made of synthetic resin. As shown in FIG. 3, the retainer 40 includes a base plate portion 41 having a plate thickness direction oriented in the vertical direction and a pair of lock portions 42 projecting downward from both left and right end parts of the base plate portion 41. The base plate portion 41 has a shape elongated in the width direction. A plurality of retaining portions 43 are formed in the same arrangement as the plurality of terminal accommodation chambers 11 on a front end part of the lower surface of the base plate portion 41. A pair of separation operating portions 44 are formed in both lateral end parts of the base plate portion 41. The separation operating portion 44 is in the form of a slit elongated in the width direction and shaped by recessing the front end surface of the base plate portion 41. In the width direction, the separation operating portions 44 are arranged at positions closer to the lock portions 42 than to a widthwise center of the retainer 40.

A pair of locking portions 45 spaced apart in the lateral direction are formed in a widthwise central part of the base plate portion 41. The pair of locking portions 45 are arranged at the same positions as the pair of separation restricting portions 21 in the width direction. The locking portion 45 projects forward from the front end surface of the base plate portion 41. The locking portion 45 is arranged at a position lower than the upper surface of the base plate portion 41. As shown in FIGS. 4 and 5, a separation guiding surface 46 inclined to be lower toward the front is formed on the upper surface of the locking portion 45. An assembly guiding surface 47 inclined to be higher toward the front is formed on the lower surface of the locking portion 45.

Next, an assembly procedure of the connector is described. First, the retainer 40 is mounted into the accommodation space 16 of the housing 10 and held at a temporary locking position. At this time, the lock portions 42 are inserted into the locking spaces 17 and locked to the temporary locking projections 18. With the retainer 40 held at the temporary locking position, the retaining portions 43 are at positions retracted upward from insertion paths for the terminal fittings 30 in the terminal accommodation chambers 11. The locking portions 45 are located above the upper wall portion 13 and the separation restricting portions 21 of the housing 10.

After the retainer 40 is mounted at the temporary locking position, the terminal fitting 30 is inserted into each terminal accommodation chamber 11. After the insertion of all the terminal fittings 30, the both widthwise end parts of the base plate portion 41 are pressed downward, thereby disengaging the lock portions 42 from the temporary locking projections 18 and pushing the retainer 40 to a complete locking position below the temporary locking position. In the process of displacing the retainer 40 to the complete locking position, the locking portions 45 interfere with the upper surfaces of the separation restricting portions 21, but resistance generated when the locking portions 45 pass the separation restricting portions 21 is reduced by the inclination of the assembly guiding surfaces 23 of the separation restricting portions 21 and the assembly guiding surfaces 47 of the locking portions 45. With the retainer 40 moved to the complete locking position, the lock portions 42 are locked to the complete locking positions 19, whereby the retainer 40 is held at the complete locking position with a displacement to the temporary locking position restricted.

With the retainer 40 held at the complete locking position, the retaining portions 43 are located to face and be lockable to the rear end edges of the terminal body portions 31 from behind. In this way, the terminal fittings 30 are held not to come out rearward from the terminal accommodation chambers 11. Since the base plate portion 41 formed with the retaining portions 43 has the plate thickness direction oriented in the vertical direction and has a shape elongated in the width direction, there is a concern that the base plate portion 41 is lifted. If the base plate portion 41 is lifted, the retaining portions 43 are separated upward from the terminal fittings 30, wherefore a retaining function by the retainer 40 is lost.

Since the lock portions 42 are locked to the housing 10, the both widthwise end parts of the base plate portion 41 are displaced upward very little. In contrast, since the base plate portion 41 is shaped to be easily curved and deformed, the widthwise central part of the base plate portion 41 is largely displaceable upward. Focusing on this point, the pair of left and right locking portions 45 are formed in a region including the widthwise center of the base plate portion 41. With the retainer 40 held at the complete locking position, the locking portions 45 are accommodated in the recesses 22 and arranged to face and be lockable to the separation restricting portions 21 from below. Therefore, even if the base plate portion 41 is going to be curved to bulge upward, an upward displacement of the base plate portion 41 is prevented by the locking portions 45 locking the separation restricting portions 21. In this way, the separation of the retaining portions 43 from the terminal fittings 30 is prevented and all the terminal fittings 30 can be reliably retained.

In pulling out the terminal fitting 30 from the terminal accommodation chamber 11 for maintenance or the like, the retainer 40 is moved from the complete locking position to the temporary locking position. At this time, a jig (not shown) is inserted into the separation operating portions 44 along the jig guiding surfaces 20 of the housing 10. Although openings at the front ends of the separation operating portions 44 are located in the accommodation space 16 and cannot be seen from outside, the jig can be reliably inserted into the separation operating portions 44 using the jig guiding surfaces 20 as marks. If a tip part of the jig inserted into the separation operating portions 44 is displaced upward by a leverage action, the lock portions 42 are disengaged from the complete locking projections 19 and the base plate portion 41 is lifted. At this time, the locking portions 45 are separated from the separation restricting portions 21 by the inclination of the separation guiding surfaces 46. After the retainer 40 is displaced to the temporary locking position, the terminal fitting 30 may be pulled out rearward by pulling the wire 35.

The connector of the present disclosure is provided with the housing 10 including the plurality of terminal accommodation chambers 11 arranged in the width direction, the plurality of terminal fittings 30 to be individually inserted into the plurality of terminal accommodation chambers 11 and the retainer 40. The retainer 40 is mounted into the housing 10 and retains the plurality of terminal fittings 30 inserted in the terminal accommodation chambers 11. The projection 33 projecting only from a part in the width direction is formed on the outer surface of the terminal fitting 30. The separation restricting portions 21 are formed in regions of the housing 10 different from the projections 33 in the width direction. The retainer 40 is formed with the locking portions 45. With the retainer 40 held at the complete locking position, the locking portions 45 lock the separation restricting portions 21, thereby restricting a displacement of the base plate portion 41 in a separation direction from the housing 10, i.e. a displacement thereof toward the temporary locking position.

Since the displacement of the retainer 40 in the separation direction from the housing 10 is restricted by the locking portions 45 locking the separation restricting portions 21, the reliability of the retaining function by the retainer 10 can be improved. By using a dead space where the projection 33 is not present in the width direction, it is realized to arrange the locking portion 45 of the retainer 40 and the projection 33 side by side in the width direction. Even if the projection 33 is formed on the terminal fitting 30, the housing 10 can be reduced in height in the height direction intersecting the width direction.

The retainer 40 includes the retaining portions 43. The retaining portions 43 retain the terminal fittings 30 by locking the terminal fittings 30 inserted into the terminal accommodation chambers 11. The locking portion 45 is arranged adjacent to the retaining portion 43 in the vertical direction. The locking portion 45 projects from the front surface of the retaining portion 43. According to this configuration, since the locking portion 45 and the retaining portion 43 are adjacently located, the reliability of a retaining function by the retaining portion 43 is high as compared to the case where the locking portion 45 is arranged at a position distant from the retaining portion 43.

The housing 10 includes the accommodation space 16 for accommodating the retainer 40. The separation restricting portion 21 is shaped by recessing a part of the surface of the housing 10 facing the accommodation space 16. The formation region of the separation restricting portion 21 in the width direction is only in the entire width range of one of the terminal accommodation chambers 11. According to this configuration, since the partition wall portion 12 partitioning between the terminal accommodation chambers 11 needs not be cut to form the separation restricting portion 21, a reduction in the strength of the partition wall portion 12 can be prevented.

The separation restricting portion 21 and the locking portion 45 are formed with the tapered assembly guiding surfaces 23, 47 configured to slide in contact with the locking portion 45 and the separation restricting portion 21 in the process of assembling the retainer 40 with the housing 10. According to this configuration, in the process of assembling the retainer 40 with the housing 10, resistance due to the interference of the separation restricting portion 21 and the locking portion 45 can be reduced by the inclination of the assembly guiding surfaces 23, 47. The locking portion 45 is formed with the tapered separation guiding surface 46 configured to slide in contact with the separation restricting portion 21 in the process of separating the retainer 40 from the housing 10. According to this configuration, resistance due to the interference of the separation restricting portion 21 and the locking portion 45 can be reduced by the inclination of the separation guiding surface 46.

The lock portions 42 for holding the retainer 40 in the state assembled with the housing 10 are formed on the both widthwise end parts of the retainer 40. The retainer 40 is formed with the separation operating portions 44, with which the jig is brought into contact when the retainer 40 is separated from the housing 10. The separation operating portions 44 are arranged at the positions closer to the lock portions 42 than to the locking portions 45 in the width direction. Since the locking portion 45 is arranged in a narrow region adjacent to the projection 33 of the terminal fitting 30, it is difficult to secure a sufficient locking force with the separation restricting portion 21. Thus, it is preferable to reliably assemble the retainer 40 with the housing 10 by enhancing holding forces by the lock portions 42. In view of this point, the separation operating portions 44 are arranged at the positions closer to the lock portions 42 than to the locking portions 45. By this arrangement, an operation of releasing hold by the lock portions 42 can be reliably performed by the jig even if the holding forces of the lock portions 42 are enhanced.

Other Embodiments

The present invention is not limited to the above described and illustrated embodiment, but is represented by claims. The present invention is intended to include all changes in the scope of claims and in the meaning and scope of equivalents and also include the following embodiments.

Although the locking portion and the retaining portion are adjacently arranged in the vertical direction in the above embodiment, the locking portion may be arranged at a position distant from the retaining portion.

Although the separation restricting portion is arranged only in the entire width range of one of the terminal accommodation chambers in the above embodiment, the separation restricting portion may be formed in a range including the partition wall portion(s).

Although the assembly guiding surfaces are formed on both the separation restricting portion and the locking portion in the above embodiment, the assembly guiding surface may be formed only on the separation restricting portion or may be formed only on the locking portion.

Although the separation guiding surface is formed only on the locking portion in the above embodiment, the separation guiding surface may be formed only on the separation restricting portion or may be formed on both the locking portion and the separation restricting portion.

Although the separation restricting portion has a recessed shape the locking portion has a projection shape in the above embodiment, the separation restricting portion may have a projection shape and the locking portion may have a recessed shape.

Although the separation operating portions are arranged at the positions closer to the lock portions than to the locking portions in the above embodiment, the separation operating portions may be arranged at intermediate positions between the lock portions and the locking portions or may be arranged at positions closer to the locking portions than to the lock portions.

LIST OF REFERENCE NUMERALS

10 . . . housing
11 . . . terminal accommodation chamber
12 . . . partition wall portion
13 . . . upper wall portion
14 . . . groove portion
15 . . . beam-like portion
16 . . . accommodation space
17 . . . locking space
18 . . . temporary locking projection
19 . . . complete locking projection
20 . . . jig guiding surface
21 . . . separation restricting portion
22 . . . recess
23 . . . assembly guiding surface
24 . . . locking surface
30 . . . terminal fitting
31 . . . terminal body portion
32 . . . crimping portion
33 . . . projection
34 . . . wire
35 . . . retainer
41 . . . base plate portion
42 . . . lock portion
43 . . . retaining portion
44 . . . separation operating portion
45 . . . locking portion
46 . . . separation guiding surface
47 . . . assembly guiding surface

What is claimed is:

1. A connector, comprising:
a housing including a plurality of terminal accommodation chambers arranged in a width direction;
a plurality of terminal fittings inserted into the plurality of terminal accommodation chambers, respectively; and
a retainer mounted into the housing, the retainer retaining the terminal fittings inserted into the terminal accommodation chambers,
wherein a projection projecting only from a part in the width direction of the housing is formed on an outer surface of the terminal fitting,
a separation restricting portion is formed in a region of the housing different from the projection in the width direction of the housing,
the retainer is with a locking portion configured to restrict a displacement in a separation direction from the housing by locking the separation restricting portion,
the locking portion and the projection are arranged side by side in the width direction of the housing with the terminal fittings retained by the retainer, and
the locking portion is provided in a widthwise central region of the retainer and locks with the separation restricting portion at a position overlapping the retainer in a direction intersecting the width direction of the housing.

2. A connector, comprising:
a housing including a plurality of terminal accommodation chambers arranged in a width direction;
a plurality of terminal fittings inserted into the plurality of terminal accommodation chambers, respectively; and
a retainer mounted into the housing, the retainer retaining the terminal fittings inserted into the terminal accommodation chambers,
wherein a projection projecting only from a part in the width direction of the housing is formed on an outer surface of the terminal fitting,
a separation restricting portion is formed in a region of the housing different from the projection in the width direction of the housing,
the retainer is formed with a locking portion configured to restrict a displacement in a separation direction from the housing by locking the separation restricting portion,
the locking portion is provided in a widthwise central region of the retainer and locks with the separation restricting portion at a position overlapping the retainer in a direction intersecting the width direction of the housing,
at least a pair of lock portions configured to hold the retainer in a state assembled with the housing are formed on both widthwise end parts of the retainer,
the retainer is formed with a separation operating portion, a jig being brought into contact with the separation operating portion when the retainer is separated from the housing, and
the separation operating portion is arranged at a position closer to the at least a pair of lock portions than to the locking portion in the width direction of the housing.

3. The connector of claim 1, wherein:
the housing includes an accommodation space configured to accommodate the retainer,
the separation restricting portion is shaped by recessing a part of a surface of the housing facing the accommodation space, and
a formation region of the separation restricting portion in the width direction is only in an entire width range of one of the terminal accommodation chambers.

4. The connector of claim 1, wherein a part of at least one of the separation restricting portion and the locking portion is formed with a tapered assembly guiding surface configured to slide in contact with a part of the other in the process of assembling the retainer with the housing.

5. The connector of claim 1, wherein a part of at least one of the separation restricting portion and the locking portion is formed with a tapered separation guiding surface configured to slide in contact with a part of the other in the process of separating the retainer from the housing.

6. The connector of claim 1, wherein:
the retainer includes retaining portions configured to retain the terminal fittings by locking the terminal fittings in the terminal accommodation chambers, and
the locking portion is arranged adjacent to the retaining portion.

7. The connector of claim 1, wherein the projection projects upwardly only from the part in a left region with respect to a center in a width direction of each of the plurality of terminal fittings.

8. The connector of claim 2, wherein the projection projects upwardly only from the part in a left region with respect to a center in a width direction of each of the plurality of terminal fittings.

* * * * *